United States Patent
Gulla et al.

[11] 3,882,967
[45] May 13, 1975

[54] DEVICE FOR LEVEL AND/OR TEMPERATURE CONTROL OF LIQUIDS

[75] Inventors: Peter Gulla, Grossheppach; Dieter Schützenauer, Schorndorf, both of Germany

[73] Assignee: Daimler-Benz Aktiengesellschaft, Stuttgart, Germany

[22] Filed: Jan. 15, 1973

[21] Appl. No.: 323,416

[30] Foreign Application Priority Data
Jan. 15, 1972 Germany.......................... 2201910

[52] U.S. Cl................ 184/103 R; 73/295; 137/389; 137/392
[51] Int. Cl...................... F01m 11/06; F01m 11/12
[58] Field of Search........ 73/295; 137/392, 44, 389; 318/482, 642; 307/116, 118; 340/52 R, 59, 244 R; 184/1.5, 103 R, 103 A

[56] References Cited
UNITED STATES PATENTS

| | | |
|---|---|---|
| 2,462,076 | 2/1949 | Dryden .................................. 73/313 |
| 2,615,442 | 10/1952 | Berry .......................... 184/103 R X |
| 2,766,406 | 10/1956 | Schwarzkopf..................... 73/295 X |
| 2,774,365 | 12/1956 | Stewart et al......................... 137/44 |
| 2,792,912 | 5/1957 | Kangas............................ 184/103 A |
| 2,855,582 | 10/1958 | Tweedale........................ 307/118 X |
| 2,928,037 | 3/1960 | Lawrence .......................... 73/295 X |
| 3,083,319 | 3/1963 | Tiemann........................ 307/117 X |
| 3,547,145 | 12/1970 | Holzer ............................. 73/304 X |
| 3,627,078 | 12/1971 | Burrows............................ 137/44 X |
| 3,657,556 | 4/1972 | Foster................................ 307/118 |
| 3,741,683 | 6/1973 | McTamaney et al............... 137/392 |

*Primary Examiner*—Richard C. Queisser
*Assistant Examiner*—Daniel M. Yasich
*Attorney, Agent, or Firm*—Craig & Antonelli

[57] ABSTRACT

An installation for controlling the level and/or temperature of liquids such as, for example, engine oil, brake fluid, cooling water, fuel, etc. in vehicles, especially in motor vehicles, with the use of temperature-dependent resistances which are incorporated in sensors whereby one or several sensors are so arranged in the liquid to be controlled and are so connected with each other that with the use of electronic threshold switching devices an unequivocal signal is produced when dropping below a predetermined liquid level and/or when exceeding or dropping below a predetermined temperature.

27 Claims, 1 Drawing Figure

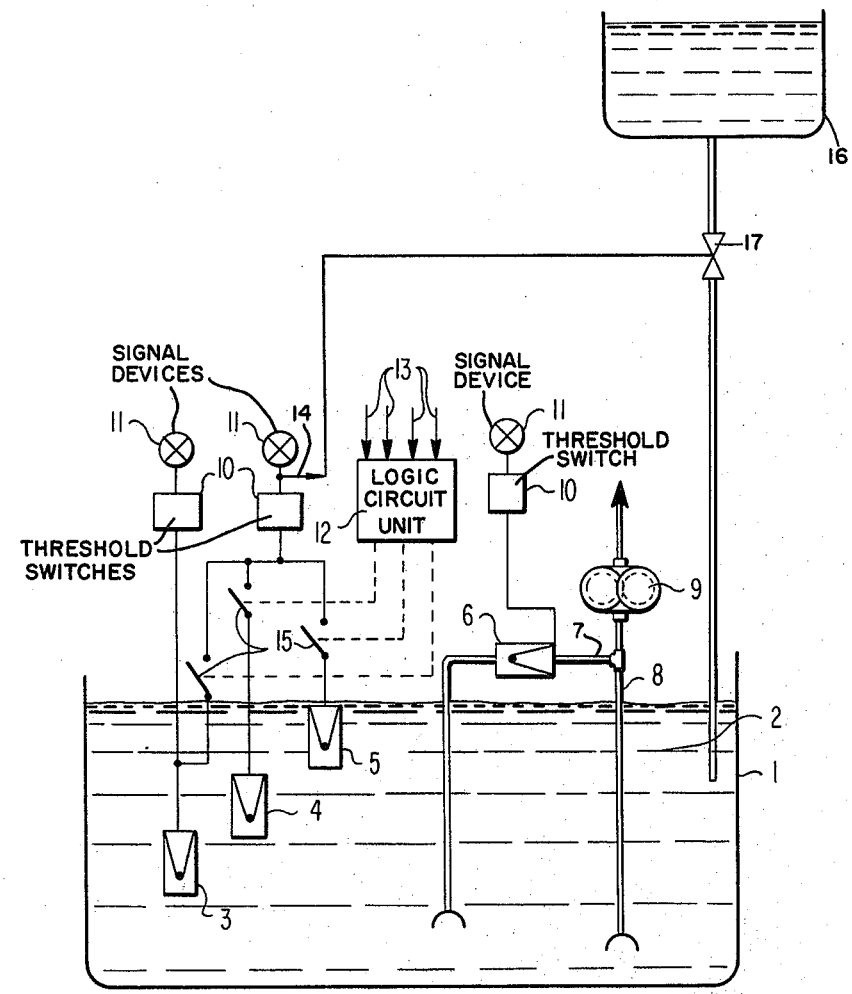

DEVICE FOR LEVEL AND/OR TEMPERATURE CONTROL OF LIQUIDS

The present invention relates to an installation for the lever and/or temperature control of liquids, for example, of engine oil, fuel, combustion liquid, cooling water, in vehicles, especially in motor vehicles, with the use of temperature-dependent resistances.

An electronic, contactless sensing of a liquid level can be realized by means of temperature-dependent resistances (so-called hot conductors and cold conductors as are available commercially). A predetermined resistance value is established by electric heating. Upon immersion into a liquid, this resistance changes due to changed heat conduction conditions and thus supplies a useful input signal for a switching amplifier. Such types of level sensors are used for heating-oil tanks. The aim of the present invention is to provide, with the use of such sensors, level, temperature, and operating control installations for motor vehicles which can carry out these controls under all given operating conditions.

The underlying problems are solved according to the present invention in that one or several sensors or feelers are so arranged in the liquid to be controlled and so connected with each other that they produce an unequivocal signal under all operating conditions with the use of conventional electronic threshold switching devices when dropping below a predetermined, presettable liquid level and/or when exceeding or dropping below a certain predetermined temperature. It is thereby necessary in a motor vehicle that the sensor or sensors are so arranged that a curve drive, inclination or sloping or tilted position of the vehicle do not exert any influence on the measurement result. With the control of, for example, the cooling water or the brake fluid, a sensor therefore generally suffices which is mounted or arranged at such a place where the level changes least during the drive. However, it is different with the control of the engine oil where various criteria, in addition to tilting and inclined position of the vehicle, act on the oil level. These criteria are, in particular, the viscosity and temperature of the oil, the engine rotational speed as well as the standing-still or running of the engine.

Accordingly, provision is made according to the present invention that with the control of the engine oil the sensor or sensors are arranged in such a manner that certain sensors are adapted to be switched on or rendered operable as a function of engine rotational speed. Additionally, provision is made according to the present invention that with the control of the engine oil, certain sensors are adapted to be engaged or switched on as a function of the starting temperature. Furthermore, provision is made in the present invention that with the control of the engine oil certain sensors are adapted to be rendered operable or switched on in dependence on the conditions "running engine" and "standing still engine."

According to the present invention, such a level sensor can also be used for the control of the oil pump operation or functioning in that a sensor is arranged in a by-pass line of the suction or pressure line of the oil pump. With a proper functioning of the oil pump, the by-pass line is filled with oil and thus the sensor is surrounded by oil whereas in case of failure of the pump, the oil flows off out of the by-pass line and thus flows off from contact with the sensor. Hot and cold conductors can be manufactured, as is known, with very differing characteristics (different temperature coefficients). They can be utilized for the temperature measurement if the temperature-dependent resistance of the sensor has a steep characteristic line within the temperature range in which lies the triggering temperature. As triggering temperature is designated that temperature, at which a signal is to be triggered or initiated. Furthermore, provision is made according to the present invention that a signal for an automatic refilling is adapted to be triggered by the control or switching signals when dropping below a predetermined liquid level.

Accordingly, it is an object of the present invention to provide an installation for the level and/or temperature control of liquids which avoids by simple means the aforementioned shortcomings and drawbacks encountered in the prior art.

A further object of the present invention resides in an installation for controlling the level and/or temperature of liquids which can be used in particular and is particularly suited for operating conditions in motor vehicles.

A further object of the present invention resides in an electronic installation for controlling the level and/or temperature of liquids which is able to properly function in motor vehicles regardless of driving conditions of the vehicle.

Still a further object of the present invention resides in a control installation of the type described above in which the measurement results remain substantially uninfluenced by centrifugal forces acting on the vehicle, tilting of the vehicle, inclination of the vehicle or other forces that may occur during operation of the vehicle.

Still another object of the present invention resides in a control installation for monitoring and controlling the level and/or temperature of liquids, especially in motor vehicles, which is simple in construction and reliable in operation yet permits the monitoring and supervision of several control functions with one and the same sensor or sensors.

These and further objects, features, and advantages of the present invention will become more apparent from the following description when taken in connection with the accompanying drawing, which shows, for purposes of illustration only, one embodiment in accordance with the present invention, and wherein:

The single FIGURE is a schematic view of an installation for controlling the oil level and oil temperature as well as the oil pump functioning according to the present invention, particularly for use in a motor vehicle.

Referring now to the schematic single FIGURE of the drawing, reference numeral 1 designates therein the oil pan or oil sump of an internal combustion engine of conventional construction which is filled with engine oil 2 and arranged in a vehicle shown in dashed line. Three sensors 3, 4, and 5 of conventional construction immerse into this engine oil 2 at different places and at different heights, i.e., to different depths within the oil sump 1. Similarly, a suction line 8 and a by-pass line 7 connected in parallel thereto which lead to the oil pump 9 also extend to different depths into the engine oil 2 of the sump 1. The sensors 3, 4, and 5 as well as the other sensors used in the control system of the present invention are of commerically available type and therefore not described in detail herein. A further sensor 6 is arranged in the by-pass line 7. The sensors 3 and 6 are connected directly with electronic threshold switching devices 10, also of conventional construction and therefore not described in detail herein, to the outputs of which are connected conventional signal transmitters 11, for example in the form of lamps or acoustic transmitters. The sensors 3, 4, and 5 are connected by way of switching contacts 15 to a further threshold switching device 10 also of conventional construction, in the output of which is again connected a signal transmitter 11 and additionally a further signal line 14 for purposes to be described more fully hereinafter. The switching contacts 15 are controlled by an electronic logic control circuit unit 12 of conventional construction as a function of different conditions 13 which are indicated only schematically by arrows. The logic circuit unit 12 is also of conventional construction utilizing conventional logic elements as known in the art and as commerically available, to process the input signals 13 into appropriate output signals to thereby control the switches 15. The logic circuit unit 12 thereby utilizes, as its inputs 13, signals representative of the various selected conditions or parameters of the vehicle. Furthermore, while the switching contacts 15 are indicated as mechanical contacts, it is readily apparent that electronic equivalents in the form of gate circuits or the like as known in the art can be used in lieu thereof. It is assumed in the schematic diagram of the single figure that the sensors are so arranged that they satisfy the mentioned conditions as will be more fully described hereinafter. This is readily possible by the selection of appropriate sensors as commercially available at present.

Certain cold conductor types behave in such a manner that in a suitable circuit, a current of, for example, in excess of 200 mA flows through the same when they are wetted by engine oil whereby the oil may have temperatures up to about 120°C. Only at higher temperatures, the current of these cold conductor types drops significantly, for example, at a temperature of about 140°C. to a value of about 150 mA. In comparison thereto, approximately 70 mA flow through a similar cold conductor surrounded by air and connected into the same circuit up to a temperature of 120°C., whereby this current flow decreases only insignificantly at higher temperatures.

The sensor 3 which is of the cold conductor type described above and which is arranged as deep as possible in the oil sump 1 serves for the oil temperature measurement. The threshold switch 10 connected thereto is adjusted to 150 mA and is connected in its output with a signal transmitter 11 that may be both an acoustic as also an optical signal transmitter. At a critical oil temperature of 140°C. the threshold switch 10 will therefore give off a switching signal to the signal transmitter 11.

In addition to the sensors 4 and 5, also the sensor 3 is used for the control of the oil level. The sensors 3, 4 and 5 are connected with the corresponding threshold switching device 10 by way of mechanical or preferably electronic switching contacts 15 or the like which are controlled by an electronic logic circuit unit 12. Signals 13 are fed as inputs into the logic circuit unit 12 which indicate whether the engine stands still or runs, within which rotational speed range the engine operates at a given time, which temperature the engine oil possesses, whether the vehicle drives through a curve or its inclined forwardly or rearwardly. Appropriate conventional means, known as such, are used to produce these various input signals 13 in the form of electrical signals.

With an engine that stands still, the sensor 5 is connected with the associated threshold switching device 10 which may also be adjusted to about 120 up to about 150 mA. With a normal oil level, this sensor 5 is surrounded by oil so that no signal is given off to the signal transmitter 11. If the engine is started, then the logic circuit unit 12 switches on the sensor 4 at normal temperatures while at lower temperatures, the logic circuit 12 connects the sensor 3 with the corresponding threshold switching device 10 since, in that case, the oil is then more viscous and the oil level drops correspondingly in the oil pan 1. If the oil has reached the operating temperature, then the sensor 4 is again rendered operable, i.e., is again switched on by the logic control unit 12. Similarly, it is possible to select between the sensors 3 and 4 with low and high rotational speed ranges depending on whether the oil level then drops or increases. This can also be made dependent possibly on the oil pressure which then has to be fed as a further signal magnitude 13 into the logic control circuit unit 12. The sensor 3 is used thereby both as temperature as also as level control.

In a similar manner, the corresponding sensors can be switched on during curve drives or inclination of the vehicle which sensors should be surrounded by oil under these conditions and with a normal oil level. The signals derived from these sensors may, according to the present invention, be used for purposes of an automatic oil refilling from a reservoir tank 16, especially in commercial types of vehicles, such as trucks. This may take place, as one example of several possibilities, in such a manner that with a standingstill engine, a signal 14 for an oil-refilling takes place when the sensor 5 produces a signal for controlling a valve 17. The refilling is terminated automatically when the sensor 5 is again surrounded by oil and the signal terminates thereby closing valve 17. For the control of the functioning of the oil pump 9 a sensor similar to sensor 5 may be arranged in the suction or pressure line of the oil pump 9. The signal produced by such sensor means that no oil is fed by the pump 9. With a normal oil level this can only mean that the oil pump 9 does not operate. A version of this type of control is illustrated in the drawing according to which a sensor 6 is arranged in a by-pass line 7 leading to the suction line 8. Since the suction opening of this by-pass line 7 is located higher in the oil sump than that of the suction line 8, also an oil level control can be carried out thereby in addition to the control of the pump functioning.

According to the present invention, such as installation can be greatly simplified by the use of only a single sensor, for example, of the sensor 6 which then takes over the control of oil level, temperature, and pump functioning. Similarly it is also quite feasible to further refine the control system by the arrangement of several additional sensors for various other control or monitoring purposes.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An installation for the level and/or temperature control of liquids in vehicles with the use of temperature dependent resistance means, comprising a plurality of sensor means, each of said sensor means including said resistance means being arranged at predetermined points in the liquid to be controlled which is contained in a vehicle container, at least one electronic threshold switching means, control means responsive to at least operating level and/or temperature parameters of the vehicle for selectively closing switching means for connecting at least one of said sensor means with at least one of said electronic threshold switching means in accordance with predetermined input signal values of the operating parameters for ensuring that an unequivocal signal indicative of level and/or temperature of the liquid is produced by said connected sensor means via said electronic threshold switching means for application to an indicating means and/or controlling means under all operating signal valve parameters of the vehicle irrespective of whether the engine is running or the position of the vehicle.

2. An installation according to claim 1, characterized in that said control means so connects the sensor means with the threshold switching means that an unequivocal signal is produced when dropping below a predetermined liquid level.

3. An installation according to claim 1, characterized in that said control means so connects the sensor means with the threshold switching means that an unequivocal signal is produced upon exceeding a predetermined temperature.

4. An installation according to claim 3, characterized in that said control means so connects the sensor means with the threshold switching means that an unequivocal signal is produced when dropping below a predetermined temperature.

5. An installation according to claim 4, characterized in that said liquid is at least one of engine oil, brake fluid, cooling water, and fuel in motor vehicles.

6. An installation according to claim 5, characterized in that said control means interconnects at least two of said sensor means with each other and with said electronic threshold switching means to produce the unequivocal signal.

7. An installation according to claim 1, characterized in that a respective sensor means is so arranged that driving the vehicle along a curve does not exert any influence on the measurement results.

8. An installation according to claim 7, characterized in that a respective sensor means is so arranged that inclination of vehicle exerts no influence on the measurement results.

9. An installation according to claim 8, characterized in that a respective sensor means is so arranged that tilting of vehicle exerts no influence on the measurement results.

10. An installation according to claim 9, wherein engine oil is the liquid, characterized in that with the control of the engine oil, engine speed is an operating parameter and the sensor means are so arranged that predetermined ones of said sensor means are connected with said threshold switching means by said control means in response to predetermined values of engine rotational speed.

11. An installation according to claim 10, characterized in that with the control of the engine oil, predetermined ones of said sensor means are connected with said threshold switching means by said control means in response to predetermined values of temperature.

12. An installation according to claim 11, characterized in that with the control of the engine oil, predetermined ones of said sensor means are connected with said threshold switching means by said control means in response to values indicative of "engine running" and "engine standing-still."

13. An installation according to claim 12, characterized in that an oil pump for circulating oil is provided which includes a suction line and a pressure line as well as a by-pass line connected with one of said lines, one of the sensor means being arranged in said by-pass line.

14. An installation according to claim 13, characterized in that the temperature dependent resistance means of the sensor means serving the temperature measurement has a steep characteristic curve property within the temperature range in which a predetermined temperature lies.

15. An installation according to claim 14, characterized by said controlling means operable by switching signals produced in a respective threshold switching means for initiating the automatic refilling when the liquid drops below a predetermined liquid level.

16. An installation according to claim 15, characterized in that said control means so connects that sensor means with the threshold switching means that an unequivocal signal is produced when dropping below a predetermined liquid level.

17. An installation according to claim 16, characterized in that said control means so connects the sensor means with the threshold switching means that an unequivocal signal is produced upon exceeding a predetermined temperature.

18. An installation according to claim 16, characterized in that said control means so connects the sensor means with the threshold switching means that an unequivocal signal is produced when dropping below a predetermined temperature.

19. An installation according to claim 18, characterized in that said control means interconnects at least two of said sensor means with each other and with said electronic threshold switching means to produce the unequivocal signal.

20. An installation according to claim 1, characterized in that a respective sensor means is so arranged that inclination of vehicle exerts no influence on the measurement results.

21. An installation according to claim 1, characterized in that a respective sensor means is so arranged that tilting of vehicle exerts no influence on the measurement results.

22. An installation for the control of engine oil according to claim 1, characterized in that with the control of the engine oil, engine speed is an operating parameter and the sensor means are so arranged that predetermined ones of said sensor means are connected with said threshold switching means by said control means in response to predetermined values of engine rotational speed.

23. An installation according to claim 1, characterized in that with the control of the engine oil, predetermined ones of said sensor means are connected with said threshold switching means by said control means in response to predetermined values of temperature.

24. An installation according to claim 1, characterized in that with the control of the engine oil, predetermined ones of said sensor means are connected with said threshold switching means by said control means in response to values indicative of "engine running" and "engine standing-still".

25. An installation according to claim 1, characterized in that an oil pump is provided for circulating oil which includes a suction line and a pressure line as well as a by-pass line connected with one of said lines, one of the sensor means being arranged in said by-pass line.

26. An installation according to claim 1, characterized in that the temperature dependent resistance means of the sensor means serving the temperature measurement has a steep characteristic curve property within the temperature range in which a perdetermined temperature lies.

27. An installation according to claim 1, characterized by said controlling means operable by switching signals produced in a respective threshold switching means for initiating the automatic refilling when the liquid level drops below a predetermined liquid level.

* * * * *